United States Patent Office 3,102,896
Patented Sept. 3, 1963

3,102,896
4-METHYL-17-ALPHA-HYDROXY-PROGESTERONE AND ESTERS THEREOF
John C. Babcock, Portage Township, Kalamazoo County, and Raymond L. Pederson, Kalamazoo, Mich., assignors to The Upjohn Company, Kalamazoo, Mich., a corporation of Michigan
No Drawing. Filed June 2, 1958, Ser. No. 738,929
3 Claims. (Cl. 260—397.4)

The present invention relates to new steroids and is more particularly concerned with certain 4-alkyl-4-pregnene-3,20-diones, to novel intermediates in the production thereof and to processes for the production of the novel compounds and novel intermediates.

The novel 4-alkyl-4-pregnene-3,20-diones of this invention, particularly the 4-methyl compounds thereof, are important physiologically active compounds. They possess central nervous system regulatory, antihormonal, particularly anticorticoid and antiprogestational, antifungal, and hypotensive activities. The novel compounds of this invention can be prepared and administered in a wide variety of oral or parenteral dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions and the like, with or without coacting antibiotics, germicides or other materials forming advantageous compositions therewith.

The novel compounds of this invention are in addition useful as intermediates for the production of the corresponding 1-dehydro steroids. Microbiological dehydrogenation of the 4-alkyl-4-pregnene-3,20-diones, represented by Formula I, with *Septomyxa affinis*, A.T.C.C. 6737, under the fermentation conditions described in U.S. 2,602,769, is productive of the corresponding 1-dehydro-compounds, e. g., 1-dehydro-4-alkyl-progesterone, 1-dehydro - 17α-hydroxy-4-alkyl-progesterone, 1-dehydro-4-alkyl-desoxycorticosterone, and 17α,21-dihdroxy-4-alkyl-1,4-pregnadiene-3,20-dione. Of these, the 4-methyl compounds are preferred. During the fermentation with *Septomyxa affinis*, ester groups when present in the starting material will, generally, be hydrolyzed. Acylation of the resulting free hydroxyl groups either at the 17- or 21-positions or both can be accomplished using the acylating agents and procedures hereinafter described for acylating the corresponding 1-nondehydrogenated compounds of this invention. These compounds, the 1-dehydro analogues of the compounds of this invention, are also physiologically active agents, with improved therapeutic ratios. They possess the same general spectrum of activity as the compounds of this invention such as central nervous system regulatory, antihormonal, antifungal, and hypotensive activity.

The novel steroids of the present invention can be represented by the following formula:

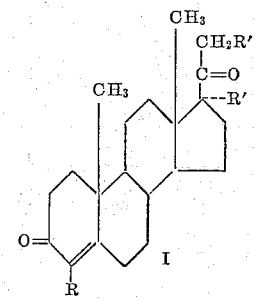

wherein R is a lower-alkyl radical containing from one to four carbon atoms, inclusive, and wherein R' is hydrogen, hydroxyl, or AcO, wherein Ac is the acyl radical of an organic carboxylic acid, preferably an aliphatic hydrocarbon carboxylic acid, containing from one to twelve carbon atoms, inclusive.

It is an object of the present invention to provide certain physiologically active 4-alkyl-4-pregnene-3,20-diones. It is another object of this invention to provide the novel intermediates, the 3-enamines of the novel 4-alkyl-4-pregnene-3,20-diones. It is another object of the present invention to provide a process for the production of the novel 4-alkyl-4-pregnene-3,20-diones. Other objects of this invention will be apparent to those skilled in the art to which this invention pertains.

The process of the present invention comprises: treating a 4-pregnene-3,20-dione with a secondary cyclic amine to produce the corresponding 3-enamine. The 3-enamine thus produced is then allowed to react with an alkylating agent to produce the 3-enamine of a 4-alkyl-4-pregnene-3,20-dione, which compound on hydrolysis yields a 4-alkyl-4-pregnene-3,20-dione. Acylation of the hydroxyl groups in those 4-alkyl-4-pregnene-3,20-diones in which hydroxyl groups are present is productive of the corresponding 17- or 21-acylates, or the 17,21-diacylates.

The compounds of the present invention can be prepared from progesterone, 17α-hydroxyprogesterone, desoxycorticosterone, and 17α,21-dihydroxy-4-pregnene-3,20-dione (Reichstein's Compound S), by following the above general procedure, or by certain alternates, as will be described more fully below.

According to the process of the present invention, the ketone group at the 3-position of a 4-pregnene-3,20-dione is converted to the 3-enamine derivative by reaction with a secondary cyclic amine. Amines which can be used are pyrrolidine, morpholine, piperidine, homomorpholine, C-alkyl substituted pyrrolidines, e.g., 2,4-dimethylpyrrolidine, 3-isopropylpyrrolidine, 3,3-dimethylpyrrolidine and the like; of these amines, pyrrolidine is preferred. The selected amine is usually used in a molar excess, calculated on the starting steroid, to achieve the optimum yield of enamine product. Although large molar equivalent excesses of the amine can be employed in the reaction, the preferred proportion of amine to starting steriod is usually from about 1.1 to about seven moles of amine per mole of steroid with excellent results obtainable in the range of about 1.1 to two moles of amine per mole of steroid.

Moisture in the reaction is somewhat detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 150 degrees centigrade. Reaction times may vary between about a few minutes to several days, depending in part upon the reaction solvent or solvents, ratio of reactants, selected amine, rate of water removal and temperature. Reaction solvents employed are benzene, toluene, xylene, chlorobenzene, pentane, hexane, chloroform, methylene chloride, carbon tetrachloride, methanol, ethanol, tertiary butyl alcohol, tetrahydrofuran, dioxane, and the like.

The 3-enamine of the 4-pregnene-3,20-dione thus produced is then alkylated in a dry inert organic solvent such as ethanol, methanol, isopropanol, butanol, tetrahydrofuran, ethyl acetate, and the like, with an excess of alkylating agent such as an alkyl halide, to produce the 4-alkyl-3-enamine of the 4-pregnene-3,20-dione. Alkyl halides thus employed are those wherein the alkyl group has from one to four carbon atoms, inclusive, and the halogen is chlorine, bromine or iodine with bromine and iodine generally preferred. Representative alkyl halides include methyl, ethyl, propyl, isopropyl, butyl, isobutyl bromide and iodide. The corresponding alkyl chlorides are also operative but usually give somewhat inferior yields.

A preferred method is to treat the 3-enamine of the pregnene-3,20-dione with an excess of alkyl iodide in dry methanol and reflux for period of about eight to 24 hours, until the reaction is complete. At the end of the reflux period, the excess alkyl iodide is removed by distillation and the 4-alkyl-3-enamine is isolated, if desired, or is hydrolyzed without isolation. For best yields it is sometimes advantageous to conduct the enamine formation and alkylation steps in an atmosphere of nitrogen. Illustrative of the enamines that can be thus produced are 3-pyrrolidyl enamine of 4-methylprogesterone, 3-pyrrolidyl enamine of 4-methyldesoxycorticosterone, 3-pyrrolidyl enamine of 4-methyl-17α-hydroxyprogesterone, 3-pyrrolidyl enamine of 4-methyl-17α,21-dihydroxy-4-pregnene-3,20-dione, and the like.

The 3-enamine of the 4-alkyl-4-pregnen-3,20-dione thus produced can then be hydrolyzed with water, aqueous acid or base, or alkanol water mixtures. This treatment removes the 3-enamine group and results in regeneration of the $\Delta^4$-3-keto group in the steroid nucleus, with production of the corresponding 4-alkyl-4-pregnene-3,20-dione. A preferred method for the hydrolysis of the 3-enamine group is in an aqueous-methanol sodium hydroxide solution, or in a water-methanol mixture, the water-methanol mixture being of particular advantage when ester groups that might be hydrolyzed with the base are present in the molecule. The hydrolysis mixture is heated under reflux for a period of about twenty minutes to about three hours, and is then either diluted with water or first concentrated by distillation to remove most of the methanol present and then diluted with water. When on dilution a crystalline product is obtained, it is isolated by filtration. When the product is not crystalline, the mixture is extracted with ether, methylene chloride, benzene, toluene, hexane or the like. The extract is then washed, dried, and the solvent removed by distillation, giving the 4-alkyl-4-pregnene-3,20-dione corresponding to the starting material, such as for example, 4-alkylprogesterone, 4-alkyl-17α-hydroxyprogesterone, 4-alkyldesoxycorticosterone, and 4-alkyl-17α,21-dihydroxy-4-pregnene-3,20-dione. The compounds thus produced can be purified by chromatography or recrystallization, or both.

The compounds of this invention, represented by Formula I, can be utilized either as the free alcohols or as the esters. Acylation of the hydroxyl groups either at the 17- or 21-positions, or both, when such hydroxyl groups are present at those positions, is accomplished by allowing the hydroxy compounds to react with the anhydride of an organic carboxylic acid, preferably a hydrocarbon carboxylic acid containing from one to twelve carbon atoms, inclusive, for example, a saturated straight-chain aliphatic acid, e.g., acetic, propionic, butyric, valeric, hexanoic, lauric, a saturated branched-chain aliphatic acid, e.g., trimethylacetic, isobutyric, isovaleric, a cycloaliphatic saturated acid, e.g., cyclohexanecarboxylic acid, an alkaryl acid, e.g., phenylacetic, 2-phenylpropionic, o-, m-, and p-toluic, a saturated dibasic acid (which can be converted into water-soluble, e.g., sodium, salts), e.g. succinic, adipic, a monobasic unsaturated acid, e.g., acrylic, crotonic, undecylenic, propiolic, cinnamic, a dibasic unsaturated acid (which can be converted into water-soluble, e.g., sodium, salts), e.g., maleic and citraconic.

Illustrative of the esters thus produced are the 4-alkyl and more particularly the 4-methyl acylates such as the 17-monoacylates, e.g., 4-methyl-17α-hydroxyprogesterone 17-acetate, 4-methyl-17α-hydroxyprogesterone 17-propionate, 4-methyl-17α-hydroxyprogesterone 17-phenylacetate; the 21-acylates such as, for example, 4-methyldesoxycorticosterone 21-acetate, 4-methyldesoxycorticosterone 21-hemisuccinate, 4-methyldesoxycorticosterone 21-isovalerate, 4-methyldesoxycorticosterone 21-maleate; the 17,21-diacylates such as, for example, 4-methyl-17α,21-dihydroxy-4-pregnene-3,20-dione 17,21-diacetate, 4-methyl-17α,21-dihydroxy-4-pregnene-3,20-dione 17,21-dipropionate, 4-methyl-17α,21-dihydroxy-4-pregnene-3,20-dione 17,21-propiolate, and the like.

In esterifying the 4-alkyl-17α,21-dihydroxy-4-pregnene-3,20-dione compounds of this invention, vigorous esterification conditions, such as for example, heating with the appropriate acid anhydride at about 100 to 150 degrees centigrade is productive of the corresponding diacylates. Mild esterification conditions such as, for example, allowing the selected 4-alkyl-17α,21-dihydroxy-4-pregnene-3,20-dione compound to react with the appropriate acid anhydride in solution in pyridine at room temperature is productive of the 21-monoacylate. 4-alkyl-17α,21-dihydroxy-4-pregnene-3,20-dione 21-acylates and more particularly 4-methyl-17α,21-dihydroxy-4-pregnene-3,20-dione 21-acylates that can be thus produced include, for example, 4-methyl-17α,21-dihydroxy-4-pregnene-3,20-dione 21-acetate, 4-methyl-17α,21-dihydroxy-4-pregnene-3,20-dione 21-cortonate, 4-methyl-17α,21-dihydroxy-4-pregnene-3,20-dione 21-butyrate, and the like.

Alternatively, the 4-alkylated acyloxy compounds of this invention, i.e., the 17- or 21-monoacylates or the 17,21-diacylates, represented by Formula I, may be prepared from the appropriate non-alkylated acyloxy starting material according to the steps hereinbefore described, i.e., formation of the 3-enamine, followed by alkylation at the 4-position, and finaly removal of the enamine blocking group.

The following examples are illustrative of the process and products of the present invention, but are not to be construed as limiting.

EXAMPLE 1

4-Methyl-4-Pregnene-3,20-Dione (4-Methylprogesterone)

A solution containing thirteen grams of progesterone in sixty milliliters of dry methanol was prepared by warming until the progesterone had dissolve and to this solution was added ten milliliters of pyrrolidine with stirring. After one minute rapid crystallization occurred. The reaction mixture was allowed to stand for ten minutes and was then cooled and the crystalline 3-pyrrolidyl enamine of progesterone was filtered, washed with twenty milliliters of methanol and with twenty milliliters of ether.

A mixture containing the above 3-pyrrolidyl enamine of progesterone, 300 milliliters of absolute methanol, and thirty milliliters of methyl iodide was warmed to reflux.

After about one hour solution was complete and reflux continued for seventeen hours. The excess methyl iodide was removed at the end of the reflux period by removing 180 milliliters of distillate by distillation. An aqueous solution of twenty milliliters of ten percent sodium hydroxide was added and the resulting mixture was heated at reflux for one and one-half hours. The solution was concentrated under reduced pressure distillation to about fifty milliliters and cooled. The concentrate was extracted with ether and the extract was washed with dilute acid, dilute alkali and water until neutral. The solution was dried over sodium sulfate and then concentrated to a syrup weighing 8.5 grams. The syrup was dissolved in fifty milliliters of methylene chloride and 100 milliliters of Skellysolve B hexanes and was adsorbed on 450 grams of synthetic magnesium silicate in a chromatographic column. The column was eluted with 200 milliliter fractions of acetone in Skellysolve B hexanes as follows:

| Fraction No.: | Solvent |
|---|---|
| 1–10 | Acetone-Skellysolve B hexanes (3:97) |
| 11–41 | Acetone-Skellysolve B hexanes (4:96) |

Fractions 23 through 31 were evaporated to dryness and the crystalline residues combined (1.9 grams) and recrystallized from acetone-cyclohexane to give 1.13 grams of 4-methyl-4-pregnene-3,20-dione having a melting point of 160 to 166 degrees centigrade, a rotation of $[\alpha]_D$ plus 173 degrees (dioxane) and a ultraviolet absorption of $$\lambda^{alc.}_{max.} \ 250.5 \ m\mu \ (a_M \ 15{,}450)$$

*Analysis.*—Calculated for $C_{22}H_{32}O_2$: C, 80.44; H, 9.82. Found: C, 80.06; H, 9.96.

Example 2

*4-Methyl-17α-Hydroxy-4-Pregnene-3,20-Dione 17-Acetate*

A solution containing fifty grams of 17α-hydroxy-4-pregnene-3,20-dione 17-acetate in 150 milliliters of methylene chloride and 500 milliliters of methanol was concentrated by boiling until most of the methylene chloride was removed (to about a volume of 500 to 550 milliliters). The solution was then cooled about five degrees, placed under nitrogen, and 25 milliliters of pyrrolidine added thereto. Crystallization took place at this temperature in about one to five minutes. The mixture was then cooled and the product filtered to give 55.75 grams of the 3-pyrrolidyl enamine of 17α-acetoxy-4-pregnene-3,20-dione of melting point 205 to 225 degrees with decomposition.

To a suspension of fifteen grams of the above 3-pyrrolidyl enamine of 17α-hydroxy-4-pregnene-3,20-dione 17-acetate in 75 milliliters of methanol, while being stirred and under nitrogen, was added thirty milliliters of methyl iodide and the mixture was heated to reflux. Twenty milliliters of methylene chloride was added and the resulting solution was allowed to reflux for seventeen hours after which it was concentrated to about fifty milliliters and diluted with fifty milliliters of water. The resulting solution was allowed to reflux for forty minutes and was then cooled and diluted with fifty milliliters of water to cause precipitation of 2.62 grams of crude solid which was isolated by filtration. The filtrate was extracted successively with benzene and with ether and the extracts were combined, washed with dilute hydrochloric acid, dilute sodium bicarbonate, and water, and chromatographed over synthetic magnesium silicate. The product, 4-methyl-17α-hydroxy-4-pregnene-3,20-dione 17-acetate which was eluted with four percent acetone in Skellysolve B hexanes weighed 1.1 grams and after two recrystallizations from methylene chloride-methanol melted at 175 to 180 degrees centigrade and had a rotation of $[\alpha]_D$ plus 86 degrees.

*Analysis.*—Calculated for $C_{24}H_{34}O_4$: C, 74.58; H, 8.87. Found: C, 74.28; H, 8.85.

Following the procedure of the above example and substituting 17α-hydroxyprogesterone as starting material therein is productive of the intermediate compound, the 3-pyrrolidyl enamine of 4-methyl-17α-hydroxyprogesterone, which on hydrolysis gives 4-methyl-17α-hydroxyprogesterone.

Following the procedure of Example 2 above, and substituting other 17α-hydroxy-4-pregnene-3,20-dione 17-acylates for 17α-hydroxy-4-pregnene-3,20-dione 17-acetate as starting material therein is productive of other 4 - methyl - 17α - hydroxy - 4 - pregnene - 3,20 - dione 17-acylates, preferably those wherein the acyl radical is that of an organic carboxylic acid, preferably a hydrocarbon carboxylic acid containing from one to twelve carbon atoms, inclusive. Illustrative of the 17-acylate compounds that can be thus produced are 4-methyl-17α-hydroxy-4-pregnene-3,20-dione 17-propionate, 4-methyl-17α-hydroxy-4-pregnene-3,20-dione 17-butyrate, 4-methyl-17α-hydroxy-4-pregnene-3,20-dione 17-phenylacetate, 4-methyl-17α-hydroxy-4-pregnene-3,20-dione 17-acrylate, 4-methyl - 17α - hydroxy - 4 - pregnen - 3,20 - dione 17 - trimethylacetate, and the like.

In like manner substituting a 21-hydroxy-4-pregnene-3,20-dione 21-acylate or 17α,21-dihydroxy-4-pregnene-3,20-dione 17,21-diacylate as starting material in Example 2 above is productive of the corresponding 4-methyl-21-hydroxy-4-pregnene-3,20-dione 21-acetate or 4-methyl-17,21-dihydroxy-4-pregnene-3,20-dione 17,21-diacylate. The preferred acyloxy and diacyloxy compounds are those wherein the acyl radical is that of an organic carboxylic acid, preferably a hydrocarbon carboxylic acid containing from one to twelve carbon atoms, inclusive.

Example 3

*4 - Methyl - 21 - Hydroxy - 4 - Pregnene - 3,20 - Dione (4-Methyldesoxycorticosterone)*

In essentially the same manner as described in Examples 1 and 2, desoxycorticosterone was converted to the corresponding 3-pyrrolidyl enamine with pyrrolidine and the 3-enamine compound was methylated with methyl iodide to give the 3-pyrrolidyl enamine of 4-methyldesoxycorticosterone which on hydrolysis gave 4-methyl-21-hydroxy-4-pregnene-3,20-dione of melting point 140.5 to 144.5 degrees centigrade after two recrystallizations from aqueous methanol.

Example 4

*4 - Methyl - 17α,21 - Dihydroxy - 4 - Pregnene - 3,20-Dione*

In essentially the same manner as described in Examples 1 and 2, 17α,21-dihydroxy-4-pregnene-3,20-dione was converted to the corresponding 3-pyrrolidyl enamine with pyrrolidine and the 3-enamine compound was methylated with methyl iodide, to give the 3-pyrrolidyl enamine of 4-methyl-17α,21-dihydroxy-4-pregnene-3,20-dione, which on hydrolysis gave 4-methyl-17α,21-dihydroxy-4-pregnene-3,20-dione.

Following the procedures described in Examples 1, 2, 3 and 4 alkylation with other alkyl halides, particularly with a lower alkyl halide wherein the alkyl radical contains from one to four carbon atoms, inclusive, such as for example methyl, ethyl, propyl, isopropyl, butyl and isobutyl bromide or iodide, is productive of other 4-alkyl-4-pregnene-3,20-diones such as for example, 4-ethyl-4-pregnene-3,20-dione,
4-isopropyl-4-pregnene-3,20-dione,
4-butyl-21-hydroxy-4-pregnene-3,20-dione,
4-isobutyl-21-hydroxy-4-pregnene-3,20-dione,
4-propyl-17α-hydroxy-4-pregnene-3,20-dione,
4-isobutyl-17α-hydroxy-4-pregnene-3,20-dione,
4-ethyl-17α, 21-dihydroxy-4-pregnene-3,20-dione,
4-butyl-17α,21-dihydroxy-4-pregnene-3,20-dione, and the like.

EXAMPLE 5

4 - Methyl - 17α,21 - Dihydroxy - 4 - Pregnene - 3,20-Dione 17,21-Diacetate

A solution of 1.5 grams of 4-methyl-17α,21-dihydroxy-4-pregnene-3,20-dione in 30 milliliters of acetic anhydride was heated at reflux for one and one-half hours. The reaction mixture was then concentrated to dryness under reduced pressure and the resulting residue was crystallized from acetone to give 4-methyl-17α,21-dihydroxy-4-pregnene-3,20-dione 17,21-diacetate.

EXAMPLE 6

4 - Methyl - 17α - Hydroxy - 4 - Pregnene - 3,20 - Dione 17-Acetate

Following the procedure of Example 5 and substituting 4-methyl-17α-hydroxyprogesterone as starting material therein is productive of 4-methyl-17α-hydroxy-4-pregnene-3,20-dione 17-acetate, identical with that obtained in Example 2.

EXAMPLE 7

4 - Methyl - 17α,21 - Dihydroxy - 4 - Pregnene - 3,20-Dione 21-Acetate

A solution of 0.5 gram of 4-methyl-17α,21-dihydroxy-4-pregnene-3,20-dione in seven milliliters of pyridine and seven milliliters of acetic anhydride was allowed to stand at room temperature (about 25 degrees centigrade) for sixteen hours. The reaction mixture was then poured into 110 milliliters of ice-water and the resulting solid material was isolated by filtration and recrystallized from acetone to give 4-methyl-17α,21-dihydroxy-4-pregnene-3,20-dione 21-acetate.

EXAMPLE 8

4 - Methyl - 21 - Hydroxy - 4 - Pregnene - 3,20 - Dione 21-Acetate

Following the procedure of Example 7 and substituting 4-methyl-21-hydroxy-4-pregnene-3,20-dione as starting material therein is productive of 4-methyl-21-hydroxy-4-pregnene-3,20-dione 21-acetate.

Similarly by following the acylation procedures described in Examples 5, 6, 7 and 8 above, still other 17- and 21-acylates and 17,21-diacylates are prepared by reacting a selected 4-alkyl-17α-hydroxy-4-pregnene-3,20-dione, 4-alkyl-21-hydroxy-4-pregnene-3,20-dione, or 4-alkyl-17α,21-dihydroxy-4-pregnene - 3,20 - dione with the appropriate hydrocarbon carboxylic acid anhydride. Illustrative of the esters thus produced are 4-methyl-17α-hydroxy-4-pregnene-3,20-dione 17-propionate, 4-methyl-17α-hydroxy-4-pregnene-3,20-dione 17-β-phenyl propionate, 4-methyl-17α-hydroxy-4-pregnene - 3,20 - dione 17-acrylate, 4-methyl-17α-hydroxy-4-pregnene - 3,20 - dione 17-hexanoate, 4-methyl-17α-hydroxy-4-pregnene-3,20-dione 17-maleate, 4-methyl-17α-hydroxy-4-pregnene-3,20-dione 17-trimethyl acetate, 4-methyl-17α-hydroxy-4-pregnene-3,20-dione 17-benzoate, 4-methyl-17α,21-dihydroxy-4-pregnene-3,20-dione 17,21-dibutyrate, 4-methyl-17α,21-dihydroxy-4-pregnene-3,20-dione 17,21-dilaurate, 4-methyl-17α,21-dihydroxy-4-pregnene-3,20 - dione 17,21 - dicyclohexane carboxylate, 4-methyl - 17α,21 - dihydroxy - 4 - pregnene-3,20-dione 17,21-dipropiolate, 4-methyl-17α,21-dihydroxy-4-pregnene-3,20-dione 17,21-diisobutyrate, 4-methyl-17α,21-dihydroxy-4-pregnene-3,20-dione 17,21- diphenylacetate, 4-methyl-17α,21-dihydroxy-4-pregnene-3,20-dione 17,21-dicrotonate, 4-methyl-21-hydroxy-4-pregnene-3,20-dione 21-valerate, 4-methyl-21-hydroxy-4-pregnene-3,20-dione 21-isovalerate, 4-methyl-21-hydroxy - 4-pregnene-3,20-dione 21-(o-, m-, p-) toluate, 4-methyl-21-hydroxy-4-pregnene-3,20-dione 21-hemisuccinate, 4-methyl-21-hydroxy-4-pregnene-3,20-dione 21-hemiadipate, 4-methyl-21-hydroxy-4-pregnene-3,20-dione 21 - crotonate, 4-methyl-21-hydroxy-4-pregnene-3,20-dione 21-undecylenate, 4-methyl-21-hydroxy-4-pregnene-3,20-dione 21-cinnamate, 4-methyl-21-hydroxy-4-pregnene-3,20-dione 21-citraconate, the 4-ethyl, propyl, isopropyl, butyl, isobutyl analogues thereof, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the group consisting of 4-methyl-17-alpha-hydroxyprogesterone and the esters thereof, of the formula:

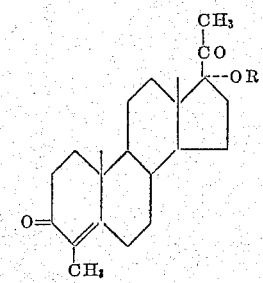

in which R is taken from the group consisting of a hydrogen atom and an acyl radical of an aliphatic carboxylic acid containing not more than nine carbon atoms.

2. A compound of the formula:

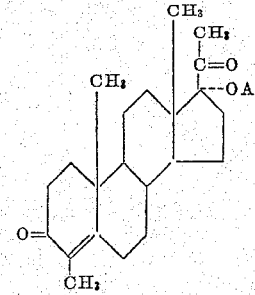

where Ac is the acyl radical of a hydrocarbon carboxylic acid containing from one to twelve carbon atoms, inclusive.

3. A compound of the formula:

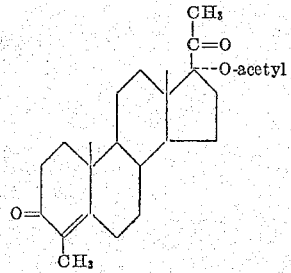

References Cited in the file of this patent

Djerassi et al.: J.A.C.S., vol 71, pages 3962–6 (1949).
Julian et al.: ibid., vol 72, pages 367–70
Gleason et al.: ibid., vol. 72, pages 1751–2.
Ott et al.: ibid., vol. 74, pages 1239–41.
Turner: ibid., vol. 75 pages, 3489–92.
Meystre et al.: Helv. Chem. Acta, vol. 34, pp. 2286–90 (1951).